(12) United States Patent
Schmidt et al.

(10) Patent No.: US 12,331,622 B2
(45) Date of Patent: Jun. 17, 2025

(54) HYDRAULIC GEOFRACTURE ENERGY STORAGE SYSTEM AND ASSOCIATED METHODS

(71) Applicant: Quidnet Energy Inc., Houston, TX (US)

(72) Inventors: Howard K. Schmidt, Cypress, TX (US); Aaron H. Mandell, Framingham, MA (US)

(73) Assignee: Quidnet Energy Inc., Houston, TX (US)

( * ) Notice: Subject to any disclaimer, the term of this patent is extended or adjusted under 35 U.S.C. 154(b) by 0 days.

(21) Appl. No.: 18/518,201

(22) Filed: Nov. 22, 2023

(65) Prior Publication Data

US 2024/0084683 A1 Mar. 14, 2024

Related U.S. Application Data

(63) Continuation-in-part of application No. 17/481,108, filed on Sep. 21, 2021, now Pat. No. 11,927,085, which is a continuation of application No. 16/889,522, filed on Jun. 1, 2020, now Pat. No. 11,125,065, which is a continuation of application No. 16/188,786, filed on Nov. 13, 2018, now Pat. No.
(Continued)

(51) Int. Cl.
*E21B 43/26* (2006.01)
*F15B 1/04* (2006.01)

(52) U.S. Cl.
CPC .............. *E21B 43/26* (2013.01); *F15B 1/04* (2013.01); *B01D 2313/367* (2022.08)

(58) Field of Classification Search
CPC ..... C09K 8/58; E21B 43/26; B01D 2313/246; B65G 5/00; Y02E 60/15; Y02E 70/30; Y02A 20/131
See application file for complete search history.

(56) References Cited

U.S. PATENT DOCUMENTS 2,454,058 A 11/1948 Hays
3,523,192 A 8/1970 Lang
(Continued)

FOREIGN PATENT DOCUMENTS

CN 1918361 A 2/2007
CN 101679042 B 3/2010
(Continued)

OTHER PUBLICATIONS

Australia Patent Examination Report No. 1 for Application No. 2010282584 dated Feb. 5, 2015.
(Continued)

*Primary Examiner* — Thomas E Lazo
(74) *Attorney, Agent, or Firm* — Tumey L.L.P.

(57) ABSTRACT

Energy may be stored by injecting fluid into a fracture in the earth and producing the fluid back while recovering power and/or desalinating water. The method may be particularly adapted to storage of large amounts of energy such as in grid-scale electric energy systems. The fracture may be formed and treated with resin so as to limit fluid loss and to increase propagation pressure. The fluid may be water containing a dissolved salt or fresh water and a portion or all of the water may be desalinated using pressure in the water when it is produced.

15 Claims, 6 Drawing Sheets

Related U.S. Application Data 10,669,471, which is a continuation-in-part of application No. 15/336,424, filed on Oct. 27, 2016, now Pat. No. 10,125,035, which is a continuation-in-part of application No. 14/318,742, filed on Jun. 30, 2014, now Pat. No. 9,481,519, which is a continuation-in-part of application No. 12/853,066, filed on Aug. 9, 2010, now Pat. No. 8,763,387.

(60) Provisional application No. 61/232,625, filed on Aug. 10, 2009.

(56) References Cited

U.S. PATENT DOCUMENTS

| | | | |
|---|---|---|---|
| 3,538,340 | A | 11/1970 | Lang |
| 3,701,383 | A * | 10/1972 | Richardson ............ E21B 43/261 166/280.1 |
| 3,850,247 | A | 11/1974 | Tinsley |
| 3,867,986 | A * | 2/1975 | Copeland ............. C09K 8/5086 166/276 |
| 3,948,325 | A | 4/1976 | Winston et al. |
| 3,996,741 | A | 12/1976 | Herberg |
| 4,182,128 | A | 1/1980 | Gardner |
| 4,421,167 | A * | 12/1983 | Erbstoesser ........... E21B 43/261 166/284 |
| 4,691,524 | A | 9/1987 | Holscher |
| 4,776,171 | A | 10/1988 | Perry, Jr. et al. |
| 5,165,235 | A | 11/1992 | Nitschke |
| 5,263,322 | A * | 11/1993 | Molini ..................... F03B 13/00 60/398 |
| 5,325,921 | A * | 7/1994 | Johnson ................. C09K 8/665 507/213 |
| 5,515,679 | A | 5/1996 | Shulman |
| 5,685,155 | A | 11/1997 | Brown et al. |
| 6,776,236 | B1 | 8/2004 | Nguyen |
| 7,213,651 | B2 | 5/2007 | Brannon et al. |
| 7,254,944 | B1 | 8/2007 | Goetzinger et al. |
| 7,281,371 | B1 | 10/2007 | Heidenreich |
| 7,772,163 | B1 | 8/2010 | Brannon et al. |
| 8,082,994 | B2 | 12/2011 | Nguyen et al. |
| 9,481,519 | B2 * | 11/2016 | Schmidt ................... C02F 1/441 |
| 10,125,035 | B2 * | 11/2018 | Schmidt ............... H02K 7/1807 |
| 11,125,065 | B2 * | 9/2021 | Schmidt ................. C09K 8/501 |
| 2002/0157398 | A1 | 10/2002 | Boyd |
| 2005/0252659 | A1 | 11/2005 | Sullivan et al. |
| 2005/0257929 | A1 * | 11/2005 | Nguyen ................ E21B 43/267 166/308.4 |
| 2005/0274523 | A1 * | 12/2005 | Brannon .................. C09K 8/80 166/308.4 |
| 2006/0151171 | A1 | 7/2006 | Davies et al. |
| 2007/0007009 | A1 | 1/2007 | Nguyen |
| 2007/0223999 | A1 | 9/2007 | Curlett |
| 2010/0183903 | A1 | 7/2010 | McGinnis et al. |
| 2010/0282470 | A1 | 11/2010 | Alberty et al. |
| 2010/0307147 | A1 | 12/2010 | Ivy et al. |
| 2011/0028358 | A1 | 2/2011 | Welton et al. |
| 2011/0030362 | A1 | 2/2011 | Schmidt |
| 2012/0043085 | A1 | 2/2012 | Willberg |
| 2012/0193092 | A1 | 8/2012 | Qu et al. |
| 2013/0056171 | A1 | 3/2013 | Klemencic |
| 2013/0062890 | A1 | 3/2013 | Saar et al. |
| 2013/0324443 | A1 | 12/2013 | Wang et al. |
| 2014/0174080 | A1 | 6/2014 | Friesth |
| 2014/0352967 | A1 | 12/2014 | Burns et al. |
| 2015/0027952 | A1 | 1/2015 | Schmidt et al. |
| 2015/0204171 | A1 | 7/2015 | Hocking |
| 2015/0204176 | A1 | 7/2015 | Cunningham et al. |
| 2022/0003095 | A1 | 1/2022 | Schmidt et al. |

FOREIGN PATENT DOCUMENTS

| | | |
|---|---|---|
| CN | 102040978 A | 5/2011 |
| CN | 102373914 B | 3/2012 |
| CN | 102530463 A | 7/2012 |
| CN | 104040114 B | 9/2014 |
| CN | 104632159 A | 5/2015 |
| CN | 105555905 A | 5/2016 |
| CN | 106560500 A | 4/2017 |
| CN | 106661936 A | 5/2017 |
| CN | 108048057 A | 5/2018 |
| GB | 2256886 A | 12/1992 |
| GB | 201416982 | 11/2014 |
| WO | 0227139 A1 | 4/2002 |
| WO | 2004035987 A1 | 4/2004 |
| WO | 2006003637 A1 | 1/2006 |
| WO | 2012061147 A1 | 5/2012 |
| WO | 2012104582 A1 | 8/2012 |
| WO | 2014028832 A1 | 2/2014 |
| WO | 2016046521 A1 | 3/2016 |
| WO | 2018081345 A1 | 5/2018 |

OTHER PUBLICATIONS

International Search Report and Written Opinion for PCT/US2015/038363 dated Oct. 8, 2015.
SPE 64980 "Water-Dispersable Resin System for Wellbore Stabilization" Society of Petroleum Engineers, 2001.
"Widths of Hydraulic Fractures" The Atlantic Refining Company Dallas, Texas, Sep. 1961.
Notice of Allowance for U.S. Appl. No. 14/318,742 dated Jun. 30, 2016.
USPTO Non-Final Office Action for U.S. Appl. No. 12/853,066 dated Sep. 4, 2013.
USPTO Non-Final Office Action for U.S. Appl. No. 12/853,066 dated Feb. 19, 2013.
USPTO Notice of Allowance for U.S. Appl. No. 12/853,066 dated Feb. 27, 2014.
International Preliminary Report on Patentability for PCT/US2015/038363 dated Jan. 3, 2017.
Australian Examination Report No. 1 for Application No. 2016203201 dated Aug. 1, 2017.
Singapore Examination Report for Application No. 11201610964V dated Nov. 13, 2017.
USPTO Notice of Allowance for U.S. Appl. No. 15/336,424 dated Jul. 11, 2018.
International Search Report and Written Opinion for Application No. PCT/US2017/058407 dated Jan. 9, 2018.
Chinese Examination Report for Application No. 2015800439312 dated Nov. 19, 2018.
Translation of Chinese Examination Report for Application No. 2015800439312 dated Nov. 19, 2018.
Chinese Office Action and English Translation for Application No. 2015800439312 dated May 5, 2019.
Indonesian Office Action and English Translation for Application No. P00 2017 00639 dated Apr. 16, 2019.
International Preliminary Report on Patentability for Application No. PCT/US2017/058407 dated May 9, 2019.
USPTO Issue Notification for U.S. Appl. No. 15/336,424 dated Oct. 24, 2018.
USPTO Issue Notification for U.S. Appl. No. 14/318,742 dated Oct. 12, 2016.
USPTO Issue Notification for U.S. Appl. No. 12/853,066 dated Jun. 11, 2014.
Chinese Office Action and English Translation for Application No. 201580043931.2 dated Nov. 18, 2019.
Powerplant Chemistry, Ruisheng Yu, et al., China Electric Power Press, First Edition dated Jan. 2006.
Chinese Office Action and English Translation for Application No. 201580043931.2 dated Mar. 3, 2020.
USPTO Issue Notification for U.S. Appl. No. 16/188,786 dated May 13, 2020.
USPTO Notice of Allowance for U.S. Appl. No. 16/188,786 dated Jan. 29, 2020.
Extended European Search Report and Written Opinion for Application No. 17865922.3 dated May 29, 2020.

(56) References Cited

OTHER PUBLICATIONS

Extended European Search Report for Application No. 19208999.3 dated Jul. 22, 2020.
Chinese Office Action and Translation for Application No. 2017800812059 dated Aug. 5, 2020.
UAE Examination Report for Application No. PCT/US2015/038363 dated Oct. 16, 2020.
UAE Search Report for Application No. PCT/US2015/038363 dated Oct. 16, 2020.
Indian Examination Report for Application No. 201917020762 dated May 28, 2021.
Chinese Office Action with Translation for Application No. 2017800812059 dated Feb. 18, 2021.
"Technology for Cementing Liners in Low Pressured Wells with High Seepage Rates and Narrow Annular Clearance in Venezuela" by Liu Zhentong et al., pp. 83-84, dated Nov. 30, 2017.
Proceedings on Oil Stabilization and Water Control in Oil Fields by Chen Tielong, p. 16, dated Aug. 31, 2001.
Chinese search report for Chinese Application No. 2019111080106 dated Sep. 30, 2021.
Chinese office action and partial English translation of the Chinese office action for Chinese Application No. 2019111080106 dated Oct. 18, 2021.
Australian Examination Report for Application No. 2017348102 dated Aug. 23, 2022.
USPTO Notice of Allowance for U.S. Appl. No. 17/481,108 dated Feb. 24, 2023.
USPTO Non-Final Office Action for U.S. Appl. No. 17/481,108 dated Jul. 7, 2022.
USPTO Notice of Allowance for U.S. Appl. No. 16/889,522 dated May 14, 2021.
USPTO Non-Final Office Action for U.S. Appl. No. 16/889,522 dated Oct. 26, 2020.
USPTO Notice of Allowance for U.S. Appl. No. 16/889,522 dated Aug. 3, 2021.
International Search Report and Written Opinion for Application No. PCT/US2023/031595 dated Jan. 17, 2024.

* cited by examiner

HYDRAULIC GEOFRACTURE ENERGY STORAGE SYSTEM AND ASSOCIATED METHODS

This Continuation-in-part application claims priority to U.S. Non-Provisional application Ser. No. 17/481,108 filed on Sep. 21, 2021, which claims priority to U.S. Non-Provisional application Ser. No. 16/889,522 filed on Jun. 1, 2020, which claims priority to U.S. Non-Provisional application Ser. No. 16/188,786 filed on Nov. 13, 2018, which claims priority to U.S. Non-Provisional application Ser. No. 15/336,424 filed on Oct. 27, 2016, which claims priority to U.S. Non-Provisional application Ser. No. 14/318,742 filed on Jun. 30, 2014, which claims priority to U.S. Non-Provisional application Ser. No. 12/853,066 filed on Aug. 9, 2010, which claims priority to U.S. Provisional Application Ser. No. 61/232,625 filed Aug. 10, 2009, all of which are hereby incorporated by reference in their entirety.

BACKGROUND OF INVENTION

1. Field of the Invention

This invention relates to energy storage and water desalination. More particularly, fluid is injected down a well to form a hydraulic fracture. Fluid may be pumped into the fracture under pressure and later produced from the fracture under pressure and used to generate power or flow into a reverse osmosis unit for desalination.

2. Discussion of Related Art

A number of factors including energy security, price volatility, carbon regulation, tax incentives and fears of anthropogenic global warming are driving rapid growth of renewable energy sources. Since liquid fossil fuels are consumed primarily in the transportation industry due to their outstanding energy density (about 45 MJ/liter) and biofuels provide only limited energy gain, the key role for renewable energy sources is to displace fossil fuel consumption in electric power generation. The U.S. presently consumes on the order of 1 TW ($10^{12}$ Watts) of electric power, so only renewable technologies that can eventually deliver 100's of GW overall are meaningful grid-scale options. Aside from hydroelectric power, which has been operating at essentially full capacity for decades, only solar- and wind-based systems can be considered at this time. Neither of these is cost-competitive today without substantial publicly-funded subsidies, although capital expenditures and operating costs are expected to drop over time, and may eventually reach price-parity with coal- and gas-fired power plants. Of these, wind-powered turbines are the more economical, with a capital expenditure (capex) of about $1.75/watt, and Texas alone has an installed base with a peak production capacity of roughly 2.5 GW.

Figure 1:
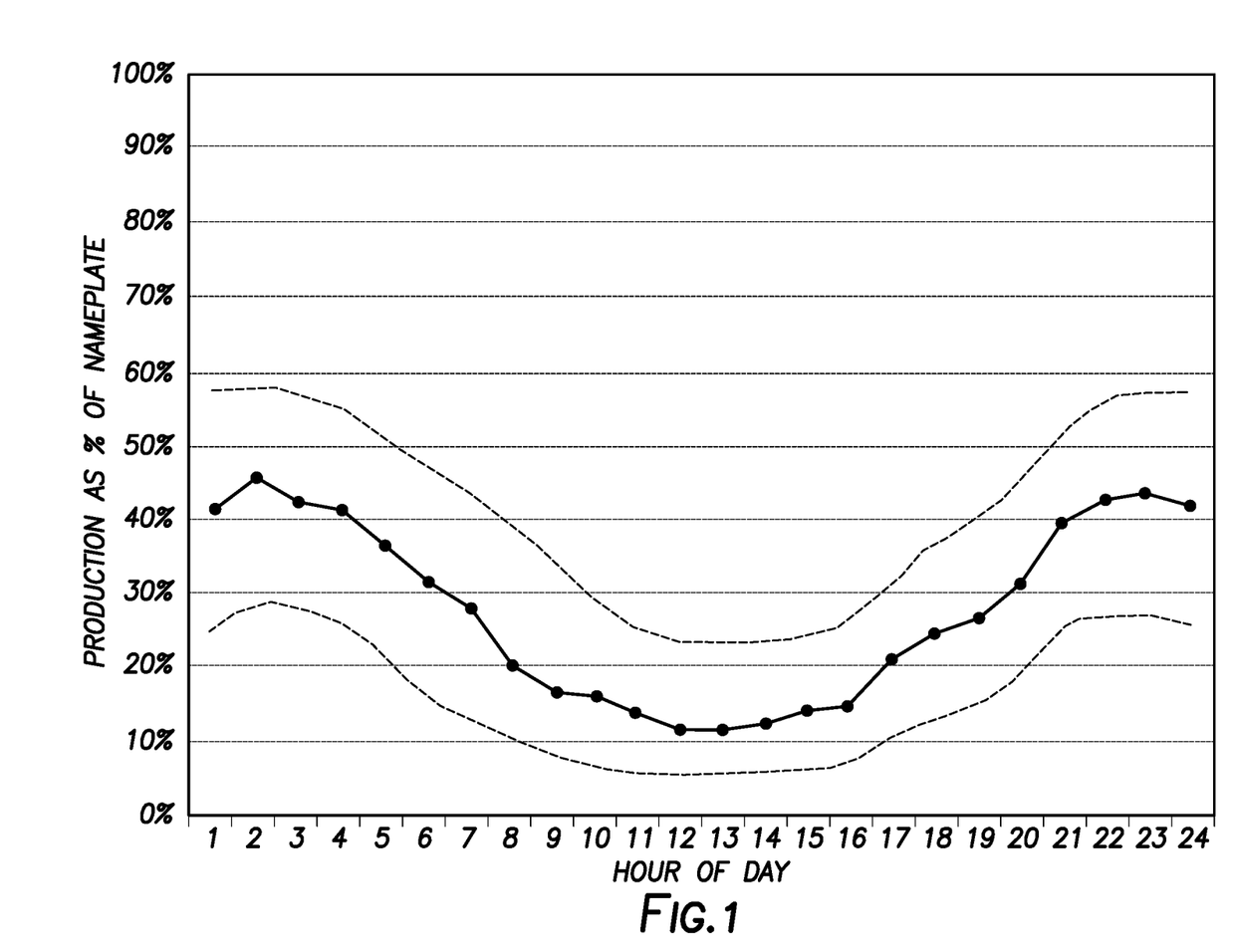
FIG. 1 shows the diurnal wind pattern at Wildorado, Texas

These two key renewable resources, wind and solar, suffer from intermittency on both daily and seasonal bases, as illustrated in FIG. 1. Neither is therefore suitable for providing base-load power. Output fluctuations also cause grid instability; without dynamic load-leveling means (e.g. smart grid technologies) renewable power sources must now be limited to less than about ten percent of delivered power on a given electric grid. As a result, renewable electric power at the grid level is limited not only by source economics, but also grid stabilization technologies.

Thus, large scale electric energy storage technology is needed in parallel with renewable energy sources. Table 1 enumerates the characteristics of candidate energy storage technologies. The most common electric storage systems in use today are based on some sort of battery technology; leading candidates include lead-acid, lithium ion and vanadium flow batteries. These are generally useful not only for leveling renewables at the source, but also for peak-shifting and improving reliability at the point of use. As of 2008, installations were being purchased by PG&E for residential areas with a rated capacity of 1 MW supply for 5 hours at a price of $2M USD. These were justified by deferring investment in increased transmission capacity (~⅔) and partly by improved quality of service (~⅓). This provides a useful scale and price-point for considering alternative storage technologies: 5,000 kw-hr capacity, and $400/kw-hr price.

TABLE 1

|  | Energy-related cost ($/kWh) | Power-related cost ($/kW) | Balance of Plant ($/kWh) | Electrolyzer ($/kW) | Compressor ($/scfm) | $\eta$, Discharge Efficiency |
|---|---|---|---|---|---|---|
| Lead-acid Batteries (low) | 175 | 200 | 50 |  |  | 0.85 |
| Lead-acid Batteries (medium) | 225 | 250 | 50 |  |  | 0.85 |
| Lead-acid Batteries (high) | 250 | 300 | 50 |  |  | 0.85 |
| Power Quality Batteries | 100 | 250 | 40 |  |  | 0.85 |
| Advanced Batteries | 245 | 300 | 40 |  |  | 0.7 |
| Micro-SMES | 72,000 | 300 | 10,000 |  |  | 0.95 |
| Mid-SMES (HTS projected) | 2000 | 300 | 1500 |  |  | 0.95 |
| SMES (HTS projected) | 500 | 300 | 100 |  |  | 0.95 |
| Flywheels (high-speed) | 25,000 | 350 | 1000 |  |  | 0.93 |
| Flywheels (low-speed) | 300 | 280 | 80 |  |  | 0.9 |
| Supercapacitors | 82,000 | 300 | 10,000 |  |  | 0.95 |
| Compressed Air Energy Storage (CAES) | 3 | 425 | 50 |  |  | 0.79 |
| Compressed Air storage in vessels (CAS) | 50 | 517 | 50 |  |  | 0.7 |
| Pumped Hydro | 10 | 600 | 2 |  |  | 0.87 |
| Hydrogen Fuel Cell/Gas Storage (low) | 15 | 500 | 50 | 300 | 112.5 | 0.59 |
| Hydrogen Fuel Cell/Gas Storage (high) | 15 | 1500 | 50 | 600 | 112.5 | 0.59 |
| Fuel Cell/Underground Storage | 1 | 500 | 50 | 300 | 112.5 | 0.59 |
| Hydrogen engine/Gas Storage | 15 | 350 | 40 | 300 | 112.5 | 0.44 |

As an applied example, a wind turbine with a rated capacity of 3 MW and typical utilization factor of 0.3 will generate about 22,000 kw-hr per day. If three battery-based storage units described above were devoted to each wind turbine, the capex would more than double, based on $5.25M for a 3 MW wind turbine installation. Plainly, current battery technology is prohibitively expensive for general grid-scale storage, even with reasonable technical improvements and economies of scale.

Figure 2:
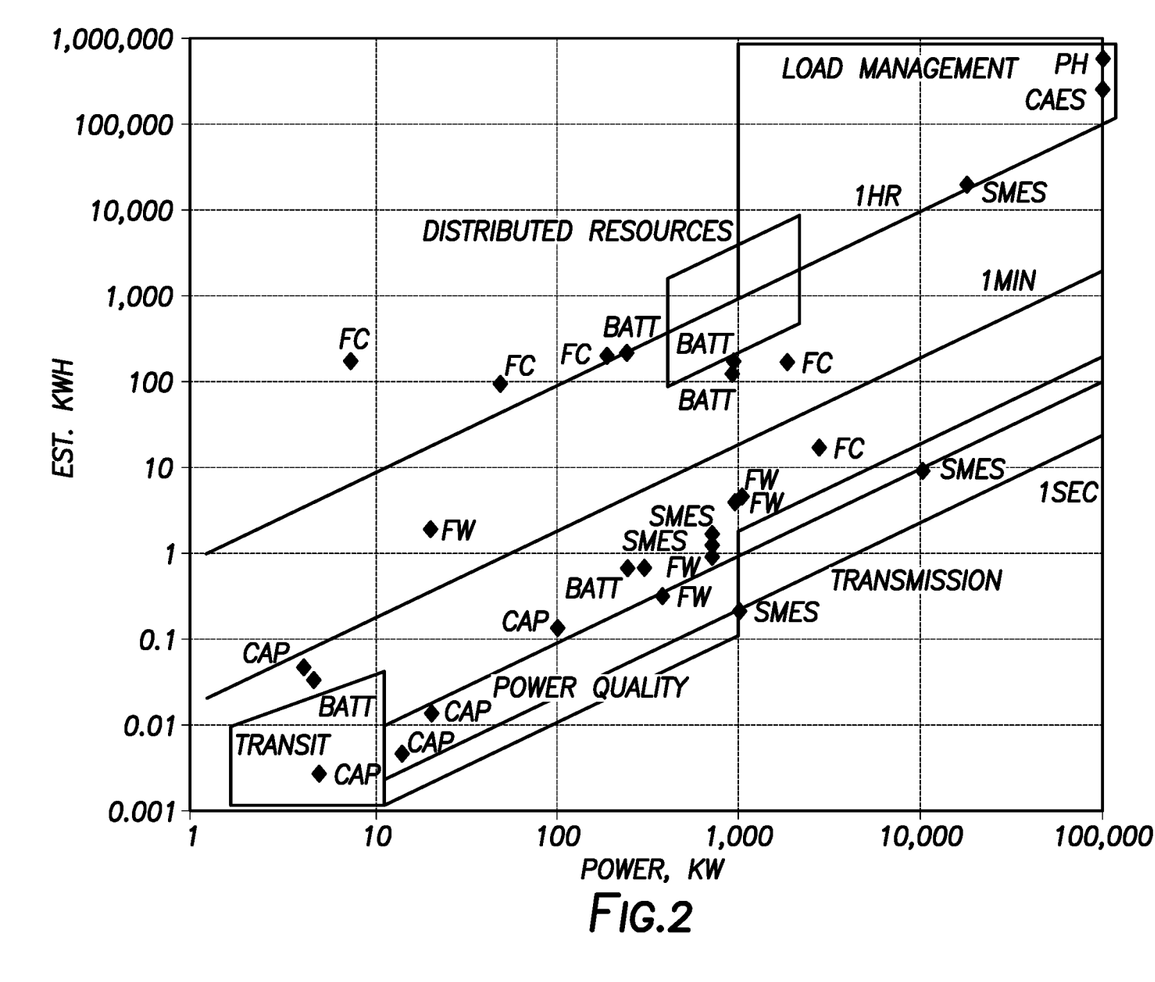
FIG. 2 shows energy storage technologies costs and efficiencies.

Leading technologies for grid-scale electric energy storage include pumped hydro and compressed air energy storage (CAES). Pumped hydro uses off-peak electric power to pump water uphill to a reservoir. This requires ready access to large amounts of water and conveniently situated terrain, both of which are in short supply in the region where wind power density is suitable—the great plains of the central US. This technical approach is certainly proven and reliable, and also enjoys excellent round-trip efficiency of ~87%. Compressed air storage systems depend on availability of abandoned mines or development of deep sub-surface caverns. This is a proven technology that can be sited over about 85% of the continental US and provides reasonable efficiency at ~80%. Since compression and expansion of air generates large temperature changes, CAES plant to deal with this parasitic energy channel is relatively complex and expensive. The chart in FIG. 2 locates various storage technologies in Power-Energy space, and clearly shows that pumped hydro and CAES stand alone in combining high total energy with high power capability.

Figure 3:
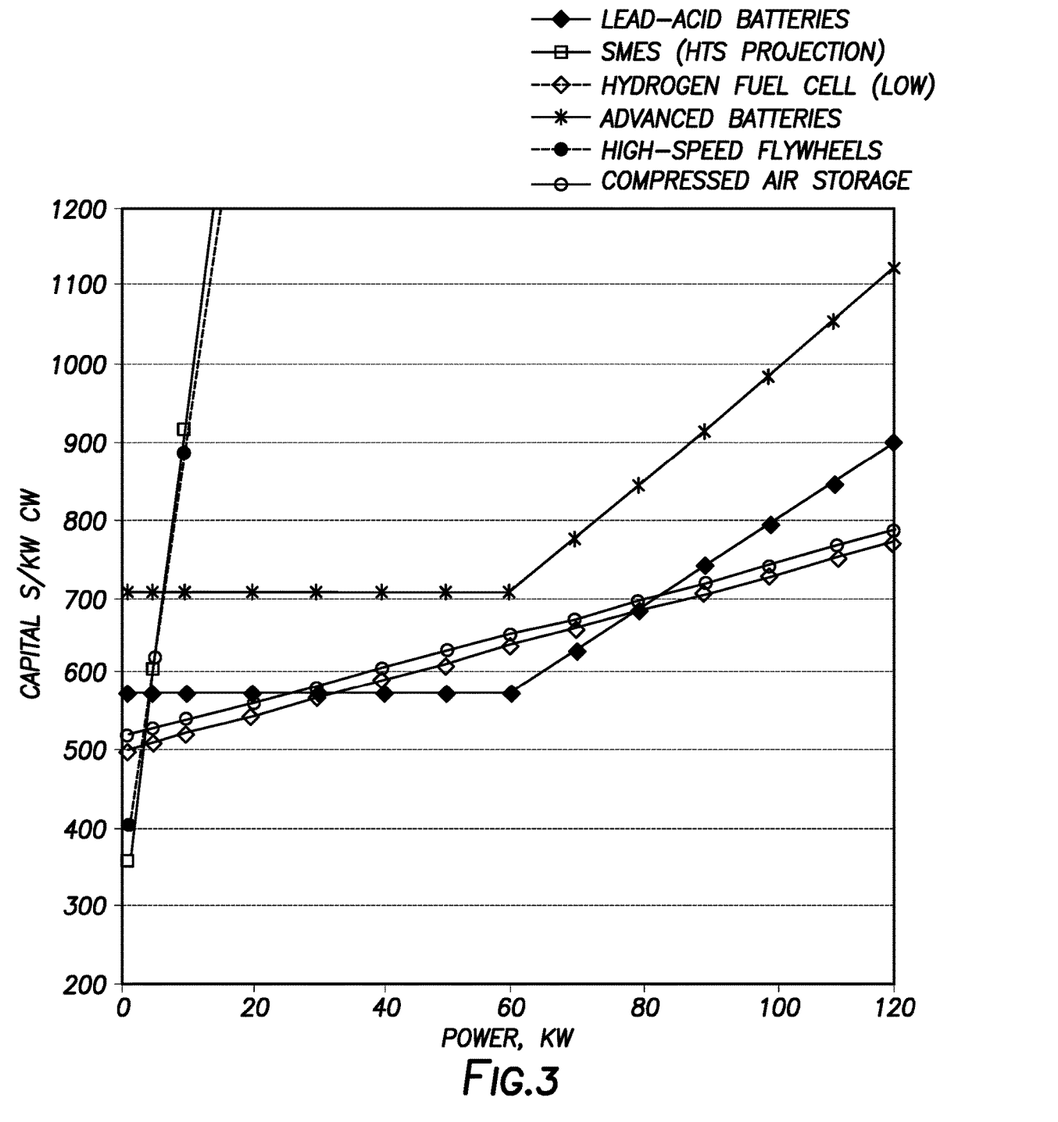
FIG. 3 shows distributed utility applications and renewables matching.

Another key application for storage technologies lies in peak shifting, or delivering extra power during short periods of extreme demand. This region is denoted 'Distributed Resources' in FIG. 2. Summer afternoon demand peaks related to air conditioning is a prime example. This is simultaneously a period of low productivity for wind turbines, unfortunately. The chart in FIG. 3 shows the estimated capital costs of various candidate technologies for servicing this application.

As noted above, this application is presently getting addressed by a few early adopters like PG&E, based primarily on deferred investment in transmission lines and improved quality of service. Certainly, there is also a marketing advantage based on the "green cachet" of distributed power.

Until such time as pumped hydro and/or CAES are deployed on a massive scale, we note that there is an interesting arbitrage opportunity in storing excess night-time power from wind turbines and reselling it during the peak demand of summer afternoons. Anecdotally, wind farms are said to actually pay grid operators to take their power at night. Wind power specialists, like Green Mountain Energy, sell wind energy at retail for $0.19/kw-hr during the day. Thus, there exists an opportunity to gross roughly $0.20/kw-hr with a twelve hour storage system. This could be quite a profitable enterprise if the storage technology is inexpensive enough. The economics of existing technologies make this a marginal proposition at best in an environment of tight capital markets and demand for high internal rates of return.

In many areas, there is also a shortage of fresh or potable water. One of the prime methods for desalination of water is reverse osmosis. This process requires pressure to overcome the osmotic pressure of salty water and force the water through a semi-permeable membrane. Thus, additional opportunities exist for combining storage technology and desalination technology.

BRIEF SUMMARY OF THE INVENTION

The present invention uses wells to store fluid at high pressure in fractures (e.g., hydraulic fractures and/or naturally occurring fractures) in the earth. The fluid is used in conventional equipment to produce power as the fluid is produced back from the well. The walls of the fracture may be made less permeable and the propagation pressure of the fracture may be increased by injecting a resin, such as epoxy, into the fracture. The storage capabilities, capital requirements and anticipated rates of return that enable a profitable operation for distributed resources and load management, as well as overnight arbitrage of wind power, are described. If the stored fluid is saline water, such as water produced from strata in the earth, and there is demand for fresh water, a selected fraction of the saline water produced from the storage capacity may be directed to a reverse osmosis unit for desalination.

DETAILED DESCRIPTION OF THE INVENTION

Figure 4:
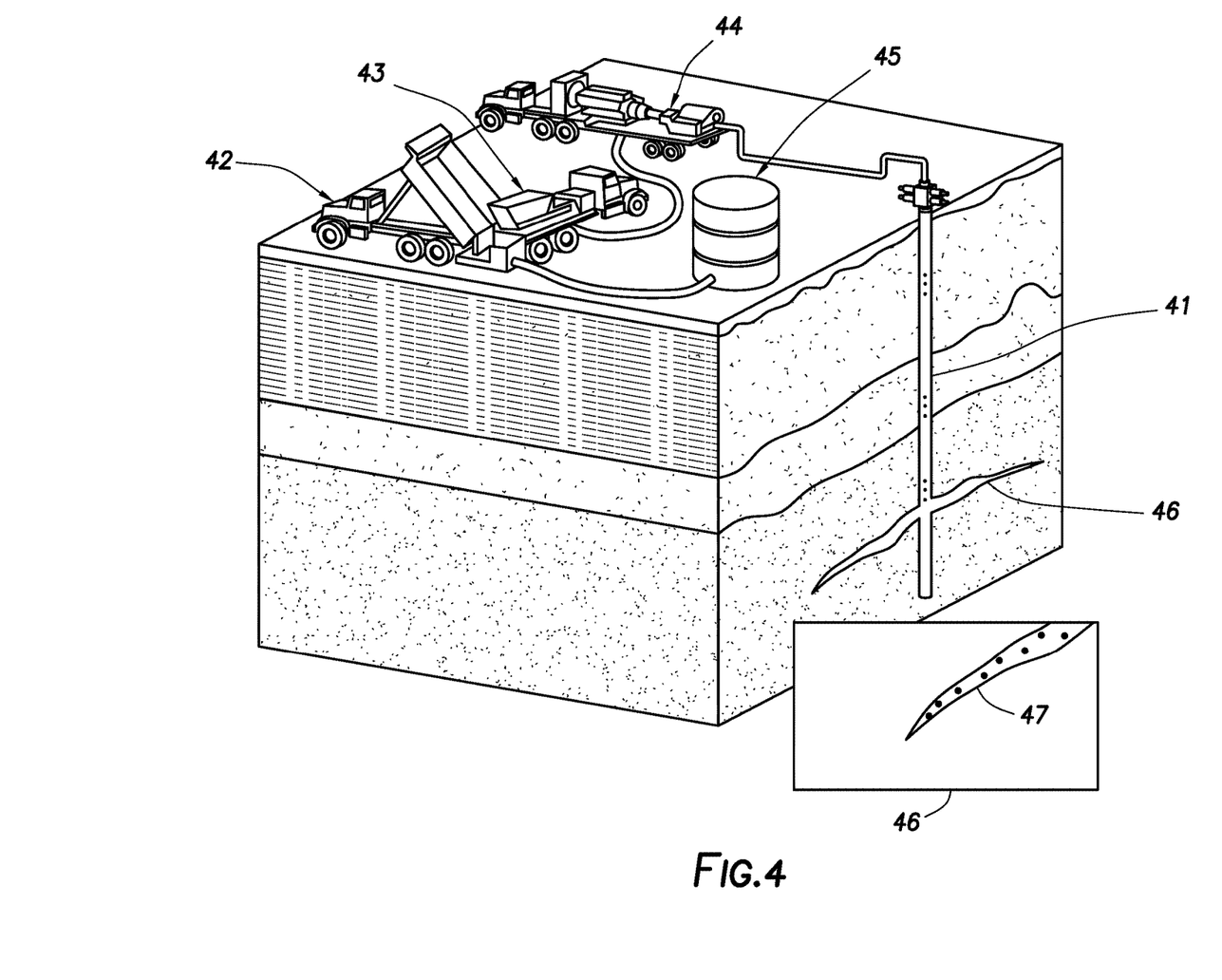
FIG. 4 illustrates a hydraulic fracture in the earth and equipment for forming it.

Hydraulic fracturing is used routinely to improve production rates from oil and gas wells drilled into low permeability reservoirs. Such fractures increase the effective productive surface area of wells into reservoir rock. Indeed, profitable exploitation of unconventional reservoirs, e.g. the Barnett Shale and Bakken Formation, can only be achieved through extensive fracturing. Briefly, after the well casing is cemented in place, perforations are created at the stratum of interest, and then a fluid is pumped down the well at high pressure to induce fractures in the rock formation around the well, as illustrated in FIG. 4. Well 41 has been drilled into a subsurface formation. Sand truck 42 may bring proppant to the well site. Fracturing fluid can be mixed and stored in tank 45, from which it is drawn to blender truck 43, where it is mixed with sand or other proppant. High-pressure pumps 44 are used to force fluid down well 41 at a pressure sufficient to form fracture 46 around the well. Proppant particles 47 may be pumped into the fracture after it has formed. The requisite pressure to form fracture 46 generally depends linearly on depth; a typical 'fracture gradient' is about 0.8 PSI per foot of well depth. So a 3,000 foot well requires a pressure of about 2,400 psi at the rock face to create a hydraulic fracture. In shallow wells (up to 1,000 to 2,000 feet deep), hydraulic fractures normally propagate horizontally. At greater depths, natural stresses in the rock tend to lead to vertically oriented fractures. For our purpose of energy storage, the orientation of the fractures is not important. In any case, energy is stored by deformation of rock around the fracture, which is primarily elastic deformation. The fracture may be primarily in one plane extending from the well through surrounding rock formation, as shown in FIG. 4, or, in naturally fractured rock such as the Barnett or Bakken shale formations, the fracture may extend over a large volume, with many different fluid paths.

A fracture in a well might extend radially from the wellbore, for example, on the order of 100 meters to 1000 meters. If the fracture is primarily in one plane, the fracture thickness can be on the order of 0.5-2 cm at the well bore. Crack propagation can be monitored in real time during the fracture operation using microseismic methods, while the degree and pattern of deformation at the surface of the earth can be measured simultaneously using tiltmeters. The fluid permeability and elastic properties of the fractured rock stratum effectively determine the extent of fracture possible with a given pumping system. As the fracture increases in length, the surface area of rock increases along with the rate of fluids entering the rock rather than filling the fracture proper. Thus, highly permeable rocks can be difficult to fracture at all, while less permeable rocks can be fractured to greater distances. Fluid loss additives (particles) may be added to the fracture fluid to decrease the rate of fluids entering the rock from the fracture. Fluid loss can be further decreased by pumping a polymer resin in the fracturing fluid. Preferably, an aliphatic epoxy resin may be used, such as described in the paper "Water-Dispersible Resin System for Wellbore Stabilization," L. Eoff et al, SPE 64980, 2001. Furan, phenolic and other epoxy resins may also be used. The resin system can be pumped as a neat resin, a resin/sand mixture, or dispersed in water- or oil-based fracturing fluid. The resin may be mixed with a diluent or solvent, which may be reactive. A slug of neat resin at the beginning of a fracture resin may be followed by a dispersion of resin in fracturing fluid and this followed with fracturing fluid. Proppant and/or fluid loss agents may be added to either of the fluids. Volumes of the different fluids are preferably selected to allow epoxy or other resin to fill the fracture to the tip and infiltrate the rock around the fracture tip. Injection of resin or resin-containing fluids may be applied repeatedly to obtain lower fluid loss from a fracture.

Figure 5A:
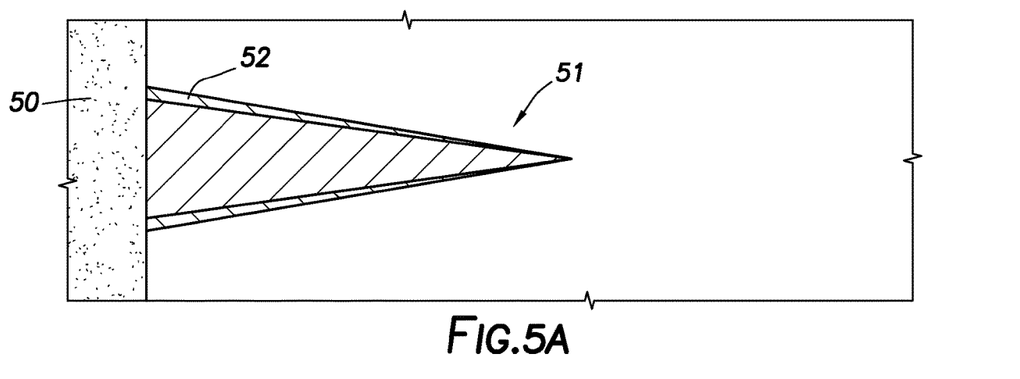
FIG. 5A is a cross section view of a fracture illustrating placement of a resin in a rock penetrated by the fracture.
Figure 5B:
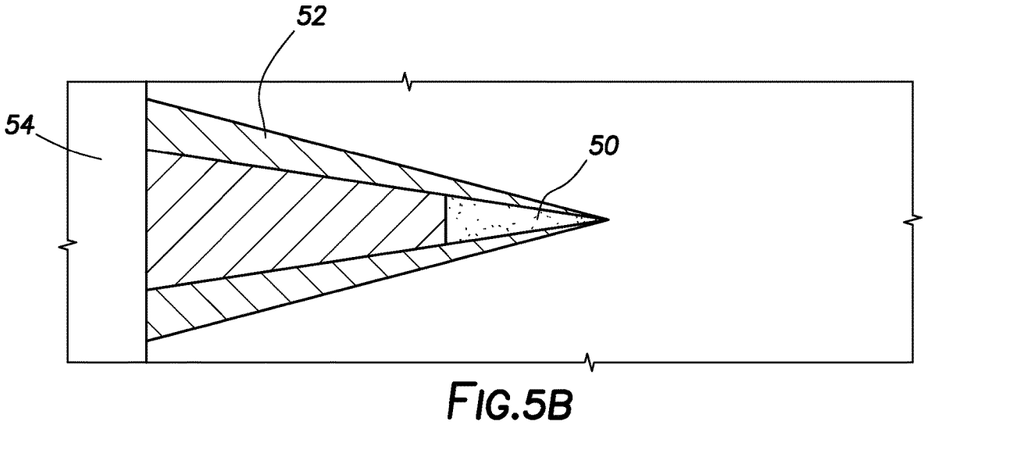
FIG. 5B is a cross section view of a fracture illustrating a displacement fluid moving the resin toward the end of the fracture.
Figure 5C:
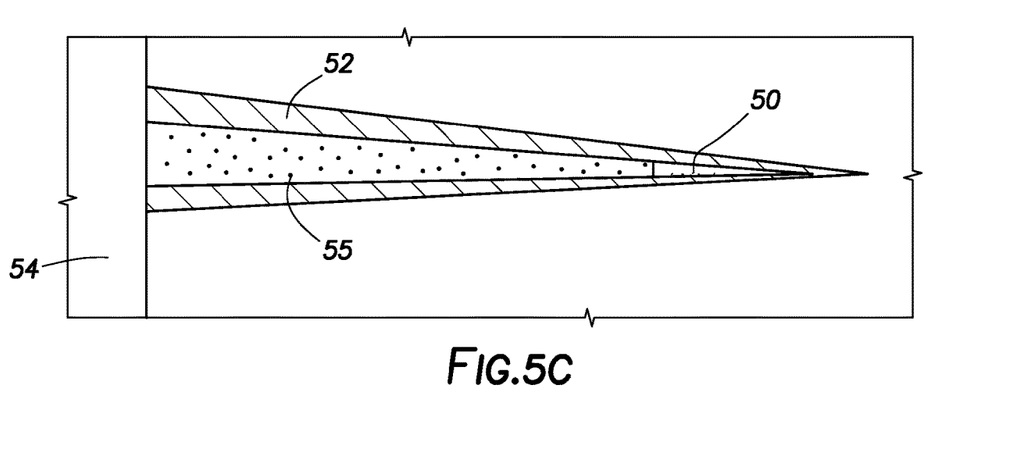
FIG. 5C is a cross section view of a fracture illustrating the resin displaced to the tip of the fracture.

FIGS. 5A, 5B and 5C illustrate, by showing cross-sections of a fracture, one method of placing a resin in a fracture to prepare the fracture for storage of energy, as taught herein. In FIG. 5A, a resin, dispersion of resin or liquid mixture with resin 50 is present in a wellbore and in fracture 51 that has been formed in rock. Resin 50 may contain a fluid loss additive. Resin-leaked-off-into-rock 52 surrounds the fracture. In FIG. 5B, displacement fluid 54, which may be water containing a viscosifier, oil-based or containing a solvent for the resin, is shown moving resin 50 toward the end of the fracture. Displacement fluid 54 preferably is more viscous than resin 50. The amount of resin-leaked-off-into-rock 52 has increased. In FIG. 5C only a limited amount of resin 50 remains in the fracture, and it is present near the tip or end of the fracture. Fracture 51 may contain proppant 55.

Fracture geometry may principally be guided by any number of stress regimes which may be present within or acting upon a formation. For example, stress conditions may vary locally in relation to intervals present within the formation, or may be introduced globally throughout the formation as a result of neighboring geological environments. In addition to the elastic and mechanical properties of a formation, which may traditionally be gauged through well logging means or laboratory measurements, the magnitude and direction of the stresses experienced within a formation may be principally or exclusively understood through in-situ testing, which may reveal the impact of factors including reservoir pore pressure and tectonic settings of environments or lithologies surrounding the formation, and may therefore act as a calibration to support geomechanical evaluation.

A variety of in-situ testing methodologies know to one of ordinary skill in the art may be used, without limitation, examples of in-situ testing include extended leakoff testing, which may incorporate pump-in, pre-closure flowback, and post-closure flowback phases measured across fixed or variable flowback rates, with the results often presented in the context of plots of time versus pressure or volume versus pressure. A presentation of these testing approaches and their applications can be found in the paper "Flowback-Based Minimum Stress Estimate in Low-Permeability Environment: Procedure, Interpretation, and Application in the Vaca Muerta Shale," S. Pichon et al., SPE-189894-MS, 2018. Within the context of the instant disclosure, a foundational interest in these approaches may be found in their interpretation of fracture closure, which may occur at the intersection of the extrapolated pre-closure and post-closure flowback slopes on a volume versus pressure plot, or fracture reopening pressure, which may be interpreted when pressure buildup deviates from a linear representation of wellbore compression in a volume versus pressure plot as the wellbore is repressurized up to the fracture propagation pressure.

Throughout the detailed description which follows, these signatures of fracture closure and reopening pressures may be recognized as conveying a more significant contribution to the applications disclosed herein than what formation breakdown, or fracture propagation, pressures might offer. Within hydraulic geofracture energy storage systems, the fracture opening pressure (in the context of fracture inflation) may be, or may be considered to be, the same as, or correlate strongly with, the fracture closing pressure (in the context of fracture deflation), and in the discussion to follow these pressures may be referred to generically as the "fracturing pressure". The lower bound of this pressure may be established by rock stresses, such as the least principal stress, and after formation of a fracture this pressure may be independent of other factors which may act upon the fracture such as tensile stress, pumping rate, viscosity, fracture toughness, or the like. As will be seen, the systems and methods that follow may be reliant upon a working fluid being cycled in and out of a fracture at pressures above the least principal stress such that the fracture may be cyclically opened (inflation resulting from the working fluid being pumped into the fracture) or closed (deflation resulting from the working fluid being produced from the fracture). Generally, the useful pressure range for cycling fluid in and out of the storage fracture ranges between the fracture opening pressure and a pressure that causes fracture propagation. The fracture propagation pressure may be generally limited by the intrinsic fracture toughness of the rock matrix, as explained within the article "Mechanical Analysis of Idealized Shallow Hydraulic Fracture," L. Murdoch, Journal of Geotechnical and Geo-environmental Engineering, June 2002; the apparent fracture toughness may be artificially increased by methods employing resins described herein or equivalent means including particulates or chemical means. Generally, such treatments are known to one of ordinary skill in the art as Lost Circulation Materials (LCMs) and Water Shut-Off (WSO) treatments. The pressure in a hydraulic fracture above the fracture opening pressure is called the "net pressure" in the fracture; it can thus be seen that these treatments may be used to increase the net pressure in the fracture. As taught within "Widths of Hydraulic Fractures,"

T Perkins et al., Journal of Petroleum Technology, September 1961, and recognized by one of ordinary skill in the art of hydraulic fracture, higher net pressures result in greater fracture widths, generally in proportion to the net pressure in the fracture.

It will be further recognized by one of ordinary skill in the art of fluid dynamics and heat exchange that flow between parallel plates generally scales with the cube of the distance between said plates. Thus, in the instant case, a doubling of net pressure in a fracture may increase flow capacity up to eight-fold. Further, it may be readily recognized that the high surface to volume ratio of a fracture in a rock matrix affords a geometry that lends itself to heat exchange between the cycling fluid and the rock matrix. In shallow fractures where the rock temperature is low (~<100° F. or lower), fractures contemplated herein may be useful for rejection of excess heat or geothermal ground loop HVAC. At greater depths or naturally hotter regions where the rock temperature is fairly high (~>100° F. or greater), fractures contemplated herein may be useful for extraction of heat that may be useful for applications ranging from process heating, district heating, co-generation or electric power production. Thus, useful work performed in these toughened fractures can derive from pressure or thermal properties of the cycling fluid.

After curing, the resin in or around the tip of the fracture will increase the propagation pressure of the fracture and allow wider fractures to be created during fluid storage. Fluid leak-off rate of fluid to be stored under pressure in the fracture can be decreased to a small or minimal value. With the achievement of low fluid loss from a fracture, gas may also be used as the working fluid for the storage process, alone or with liquid.

For the purposes of energy storage, we are interested in large fractures with little fluid loss. Ideally the fluid loss will be zero, and so suitable rock strata may be completely impermeable. We note that additives used to reduce or eliminate fluid loss from a fracture during fracturing would be useful in this application to reduce or eliminate fluid loss in slightly permeable rock strata. Materials useful for reducing fluid invasion include polymers, fine silica, clays, possibly new nanostructured materials like graphene suspensions and mixtures of selected materials. Any fluid injected into the fracture may contain a proppant or it may not contain a proppant.

Under these conditions we note that the energy used to generate the fracture can be partitioned into three main categories: fluid friction (lost, depends on pumping rates and pipe sizes in the well), cracking rock (small; lost), and elastic flexure of rock surrounding the fracture. Importantly, we note that the energy used to deform the rock elastically is actually stored as potential energy. This energy can be recovered from the fluid stream ejected from the fracture and borehole as the rock relaxes to its original position. Thus, after a large fracture is formed, the fluid filled space can be used to hydraulically lift (and flex) overburden and store mechanical energy. That energy can be efficiently recovered by allowing the pressurized fluid to escape through a turbine. The process of injecting fluids at a pressure above the fracture gradient may be repeated a selected number of times, alternately with the process of producing fluid back to generate power. Thus, the fracture functions as an elastic storage vessel. Overall, this scheme is conceptually similar to pumped hydro systems. Instead of pumping water alone uphill, however, we will pump water down, and use it to hydraulically lift and flex a large dense block of earth or deform the earth elastically. The key components (pumps, turbines) and loss channels (fluid friction) are similar or common to both, so we expect that this new approach will have about the same overall efficiency as pumped hydro, at about 87% on a round trip basis.

A key advantage of this new approach is that flat terrain can be used, and massive earthworks and environmental impacts are eliminated.

We show below a pair of example fracture installations to demonstrate the scale of energy storage available by this new approach assuming that the rock deformation or lifting that occurs around a hydraulic fracture can be represented by the following:

Example 1. 1 km Deep Well, with 1 cm Average Lift Over 100 Meter Radius (Typical Oilfield, Frac)

| | | |
|---|---:|---|
| Well depth: | 1,000 | m |
| Fracture radius: | 100 | m |
| Slug volume: | 31,400,000 | m$^3$ |
| Rock density: | 2,800 | kg/m$^3$ |
| Slug mass: | 87,900,000,000 | kg |
| Slug weight: | 862,000,000,000 | Newtons |
| Average lift: | 1 | cm |
| Lift energy: | 8,620,000,000 | Joules  8.6 E 9 Joules |
| Storage capacity: | 2,395 | kw-hr |

Example 2. 1 km Deep Well, with 10 cm Average Lift Over 500 Meter Radius

Well depth: 1,000 m
Fracture radius: 500 m
Slug volume: 7.85 E 8 m$^3$
Rock density: 2,800 kg/m$^3$
Slug mass: 2.20 E 12 kg
Slug weight: 2.16 E 13 Newtons
Average lift: 10 cm
Lift energy: 2.16 E 12 Joule
Storage capacity: 5.99 E 5 kw-hr Although explanations of hydraulic fracture properties are described, Applicant does not wish to be bound by a particular scientific theory concerning the properties of hydraulic fractures.

For comparison, a 3 MW wind turbine operating at typical 30% utilization factor generates 2.16 E4 kw-hr per day. The unit described in example 2 can therefore store the entire nominal daily output of wind farm comprised of 167 turbines. If one purchased a battery based storage system for this amount of stored energy at current prices ($400/kw-hr), a capital investment of roughly $239 Million would be required. We expect that the capital investment for energy storage in such hydraulic fractures would be roughly three to ten times less. The scale of energy storage is plainly in the load management regime (FIG. 2), which is presently only accessible by pumped hydro and CAES technology. If the system in this example were cycled at 30% of capacity each day, the arbitrage value would be approximately $18,000 per day at $0.10 per kw-hr.

The fluid injected into a fracture may be liquid or gas. A suitable fluid is brine produced from a strata in the earth below the potable water equifers. The brine may be produced along with hydrocarbon production. If brine or water containing dissolved salt is injected into the fracture of FIG. 4 or 5, the fluid produced back will be essentially of the same composition as the fluid injected. The pressure of the produced fluid will be at an elevated level until the fracture closes. The excess pressure may be used to produce power, as disclosed above, or the excess pressure may be used to desalinate a portion of the produced water or all the produced water, as illustrated in FIG. 6.

Figure 6:
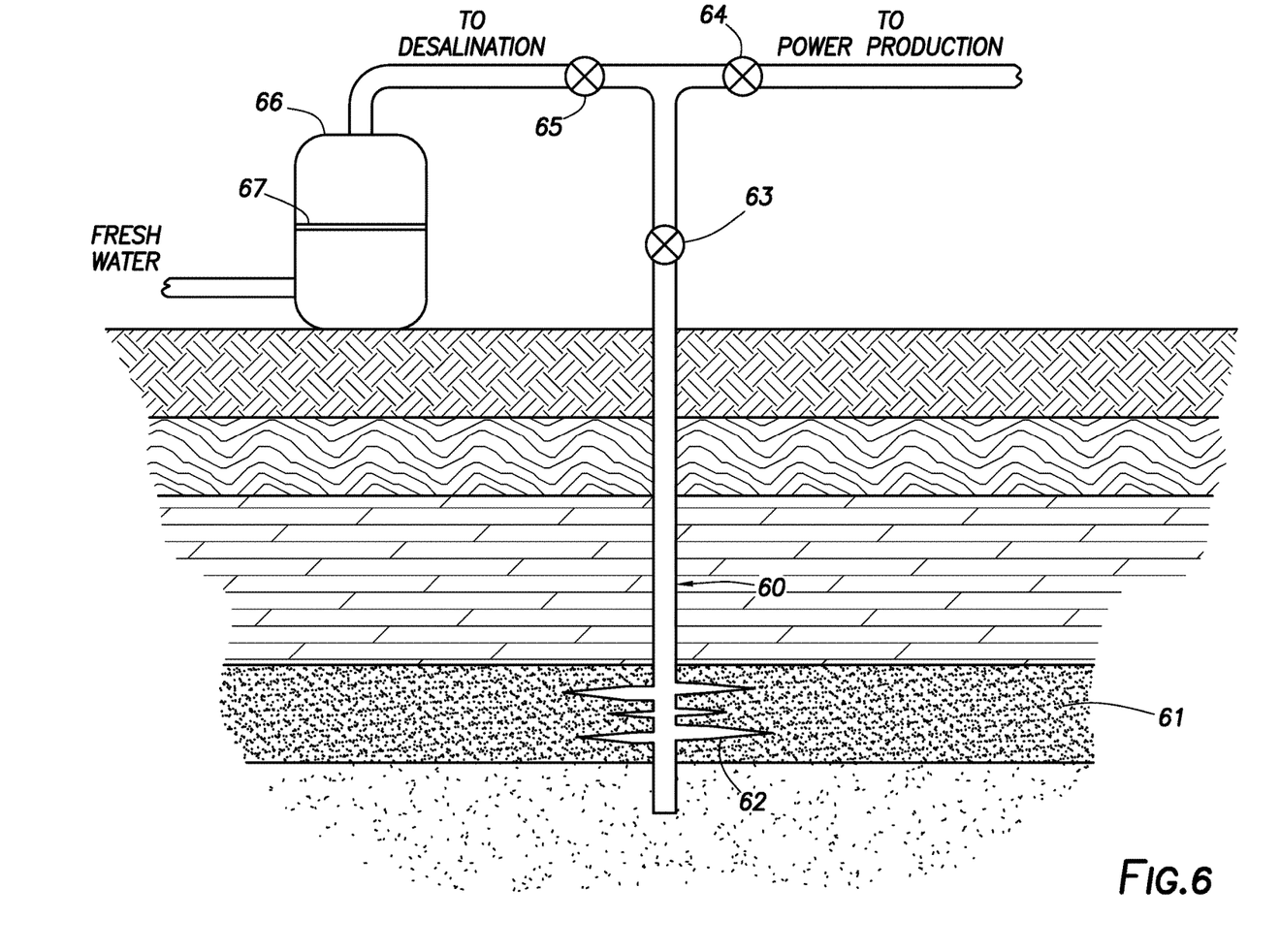
FIG. 6 illustrates a hydraulic fracture in the earth around a well and equipment on the earth's surface for controlling flowback from the fracture and generating power or desalinating water.

Referring to FIG. 6, well 60 has been drilled and hydraulic fracture or fractures 62 have been formed in the well. Leakoff from the fracture has been limited, as discussed above. Tubulars have been placed in the well and valve 63 installed to control flow in or out of the well. The well may then be connected to valve 64 for controlling flow to power generation facilities, as discussed above, during a flowback phase. The well may also be connected to desalination or other water-treatment facilities through valve 65. A preferred water-treatment facility is a reverse osmosis unit, such as unit 66. Using elevated pressure of fluid flowing back from well 60, semi-permeable membrane 67 allows removal of dissolved salt from water and production of fresh water, as shown in the figure. Valves 64 and 65 may both be opened during a flowback phase of stored water at elevated pressure, allowing both production of power and production of desalinated water. Alternately, either one of valves 64 and 65 may be closed and all produced fluid be used for one purpose, such as desalination. Alternatively, either valve may also be varied in opening or closing during a flowback phase. Variation of the opening of the valves in response to variation in pressure of the produced fluid during a flowback phase may improve results of the combined processes of power generation and desalination.

Depending on the salinity of the water being treated, reverse osmosis will typically require anywhere from 200-1200 psi of differential pressure across a semi-permeable membrane. This is typically the range of driving force that is required to overcome the osmotic pressure and cause water to flow through the semi-permeable membrane. Typical flow rates are 15-35 gal/ft$^2$/day (GFD) for seawater, depending on the process conditions.

A range of water content may be used—from very low salinity (small amounts of TDS coming out of a stratum during normal operation), to moderate salinity (using brackish groundwater or water produced along with hydrocarbon as the injectate), to elevated salinities (high salinity process water). Reverse osmosis can be used to both control the water quality of the storage facility during normal operation, i.e., remove dissolved solids that may affect the performance of the reservoir, for example, causing scale build-up in the well and/or inside the fractures, as well as a method for converting non-potable sources of water to potable quality (e.g. "pumped hydro desalination"). Devices well-known in reverse osmosis processes, such as pressure exchanger energy recovery devices (available from Energy Recovery, Inc.) may be used. This provides a way to integrate energy storage and water treatment/desalination. If no power is produced during flowback, the process can be viewed as essentially converting stored energy directly into useful work by desalting water.

The water injected into fractures has been described and having dissolved salt, but fresh water (having no dissolved salts) may also be used as a working fluid. The pressure of fresh water flowing back from a fracture can then be exchanged to water to be desalinated such that the saline water can then be desalinated using reverse osmosis. Pressure exchangers such as described above may be used for this purpose.

In certain embodiments, particulates may be injected into a fracture during fracture generation and/or expansion operations to flow to a propagating tip of a fracture which may achieve bridging and screen out and thereby may prevent further fracture propagation. In some embodiments, particulates may be injected into a fracture to flow to a tip of the fracture which may achieve bridging and screen out and thereby may prevent further fracture propagation. In embodiments, bridging may include plugging off pore spaces or fluid paths in a rock formation. A bridge may be partial or total, and without limitation may be caused by solids, such as, drilled solids, cuttings, cavings (e.g., pieces of rock from the wellbore; cavings may be splinters, shards, chunks and/or various shapes of rock) and/or junk that may become lodged together in a narrow spot. Screen out may include a condition that may occur when solids carried in a treatment fluid, such as a proppant in a fracture fluid, create a bridge across perforations or a similar restricted flow area. Without limitation, this may create a significant restriction to fluid flow that may cause a rapid rise in pump pressure. The particulates may include a range of sizes to achieve both bridging and mutual straining so as to minimize fluid flow past the bridge. The particulates may be close to neutrally buoyant or neutrally buoyant in a fluid (e.g., an operating fluid such as water and/or polymers). The particulates may be compliant/compressible so that they may be compressed during a flow-back/power generation cycle and then expand in place (e.g., in a fracture) to maintain location and bridging in the vicinity of the tip of the fracture.

Permeable rock formations may be utilized for energy (e.g., hydraulic energy) storage by intentionally inducing rock formation damage to reduce said permeability of the rock formation by injecting materials suspended in the operating fluid to bridge, plug, block, cover or swell pores and/or pore throats (e.g., in an intergranular rock, pore throats may be a pore space at a point where two grains meet, which may connect two larger pore volumes; the number, size and distribution of the pore throats may control many of the resistivity, flow and capillary-pressure characteristics of the rock formation) in the rock formation which may be permeable. In certain embodiments, the materials suspended in the operating fluid may comprise a mixture of solid particles suspended in the fluid configured/designed to plug the pores in the rock formation (e.g., silica flour, ground marble and the like). In other embodiments, the materials suspended in the operating fluid may comprise plate shaped materials, such as, for example, bentonite clay, graphene or graphite oxide for covering the pores in the rock formation and blocking fluid flow in the rock formation. In some embodiments, the materials suspended in the operating fluid may comprise plate shaped particles, spherical particles, rod shaped particles, elongated particles, fibrous particles or combinations thereof. Yet, in other embodiments, the materials suspended in the operating fluid may comprise colloidal suspensions (i.e., a suspension of colloids) of resins or organic materials that may bridge pores in the rock formation and wet the surface of the rock formation and/or pore throats of the rock formation. The colloids may be, for example, a latex thermoset resin that may solidify after filling pore throats in the rock formation. In some embodiments, the materials suspended in the operating fluid may comprise a colloidal suspension of fluids that may wet the rock formation and a high surface tension that may reduce the relative permeability of an aqueous working fluid (e.g., an aqueous portion of the operating fluid) in an energy storage system. An example of a colloidal suspension of fluids that may wet the rock formation and may comprise a high surface tension that may reduce the relative permeability of an aqueous working fluid may include viscous oil droplets that may wet the surface of organic rich shales or somewhat hydrophobic surfaces of carbonate rocks, such as, for example, calcite, limestone and/or dolomite.

Depleted tight gas reservoirs that may have been previously fractured directly, may be utilized as water energy storage reservoirs (e.g., tight sandstone reservoirs that may be naturally hydrophilic—the water itself may cause formation damage to decrease the relative permeability of hydrocarbons and may allow water storage without production of gas or other hydrocarbons, e.g., problematic gases or other hydrocarbons).

In certain embodiments, fractures may be formatted (e.g., fill, inflate and/or expand) by water injection. Water may be cycled/injected into and out of a fracture without propagating the fracture. Pressure at all points of the power cycle may be kept below a fracture propagation pressure.

In certain embodiments, pressurized fluid may be stored in a fracture and may be directly fed into a pressurized reverse osmosis desalination element (e.g., membrane). There may be no additional pressurization steps required for desalination—the fluid may have already been pressurized during injection into a fracture. Additionally, energy may be stored in a fracture, and may be converted to electricity using a turbine/generator and then the energy may power a desalination process (e.g., an energy water nexus—a generation of energy and water may be related). Storing energy in fractures may buffer the intermittent nature of renewable energy, i.e., desalination may require a consistent and highly reliable energy supply in order to be cost effective and therefore may require inexpensive storage in order to effectively utilize renewable energy. Photovoltaic ("PV") solar may be an energy source (e.g., energy from PV solar may be stored by using hydraulic fractures and may be delivered to reverse osmosis desalination plants). This technique may also be used to mitigate a demand from existing reverse osmosis desalination plants on a grid, i.e., desalination capacity may be taken off a grid by using this storage technique. In certain embodiments, desalinated water may be stored in fractures. Geothermal energy may also be a source of energy for this process in order to perform geothermal desalination. Sources of water to be treated (e.g., desalinated) may include seawater, saline groundwater, produced oil, produced gas, flow back water, process wastewater, industrial wastewater, cooling tower blow down, and/or municipal wastewater.

In certain embodiments, ductile shales and other suitable fine-grained formations with low permeability may provide the ideal matrix for subsurface hydraulic energy storage. However, many shale regions may contain water-reactive clays and may become mechanically unstable in the presence of water-based fracture fluids and/or working fluids. To increase the range of applicable shale regions for hydraulic energy storage, and similarly for argillaceous strata and poorly consolidated matrices, a method employing a range of treatments and procedures for reducing water reactivity and/or increasing matrix strength may be discussed further below.

Shale instability may be a pertinent and long-standing problem encountered while drilling wells for hydrocarbons. Means for temporarily stabilizing shales during drilling and casing operations may have previously been developed. Concerning the present disclosure, a new method for long-term stabilization of reactive shale formations may be disclosed. Generally, drilling fluid additives that stabilize such problem regions of shale may reduce water activity by using salts (i.e., KCl, NaCl, Ca Cl$_2$), bind clays with coordinating polymers, coat the rock surface with hydrophobic emulsions (i.e., Gilsonite, emulsified asphalt, petroleum sulfonates), and/or combinations thereof. Without limitations, the coordinating polymers for binding clays may be partially hydrolyzed polyacrylamide, anionic polyacrylamide, cationic polyacrylamide, polyamines, polyethylene oxides, and/or combinations thereof. Silicate chemistries, such as sodium silicate or potassium silicate, that dehydrate shales while generating gels in the presence of polyvalent cations (e.g., $Ca^{++}$) may be particularly advantageous. Similarly, chemistries used for water purification via flocculation (i.e., iron sulfate, iron chloride, aluminum sulfate, aluminum chloride, and/or combinations thereof) may be gainfully used for binding clays and stabilizing reactive shales.

In embodiments, fractures may be created and/or expanded using a sequence of fluids that react to form precipitates, or gels, that inhibit fluid transport through pores or small channels. In certain embodiments, reactants within the sequence of fluids may not be pre-mixed prior to injection, but instead may be allowed to mix in-situ. In alternate embodiments, reactants within the sequence of fluids may be pre-mixed prior to injection. The reactants within the sequence of fluids may be introduced into a fracture in various inflation steps separated by extraction of injected fluids, relying that reactants may remain in matrix pores or adsorbed to matrix surfaces. During operations, as a sequence of fluids is injected, multiphase fluid flow may dictate the characteristics of fluid flow. Fresh water or similar flush fluids may be used as spacers, or "slugs," wherein a slug is a designated volume of an individual substance, between the introductions of varying reactants. The slugs of the reactants may be selected from representative classes of shale stabilizers mentioned above, including mixtures thereof. In embodiments, the mixtures for a given slug of a reactant may react to form precipitates and/or gels if certain species are mixed. A sequence of slugs of reactants may be selected to support the generation of precipitates and/or gels in situ.

Precipitates and/or gels may be formed, without limitation, by combinations of polyvalent cations such as $Ca^{++}$, $Mg^{++}$, $Al^{++}$, $Fe^{++}$, $Fe^{+++}$, and/or combinations thereof, with certain anions such as sulfate, carbonate, silicate, phosphate, oxalate, and/or combinations thereof. Additionally, iron and aluminum salts may generate flocculants for water purification without the specific reacting ions as mentioned above. Without limitation, precipitates of particular interest may include calcium carbonate, calcium sulfate, calcium silicate, calcium phosphate, and/or combinations thereof. Calcium may generally be introduced as $CaCl_2$. Anions may be introduced in a separate slug in the form of the corresponding sodium and/or potassium salts. In certain embodiments, polymers and/or particulates (i.e., clays, fumed silica, and/or combinations thereof) to increase viscosity and pore plugging capability may be added to the fluid slugs as needed, wherein the polymers and/or particulates are non-reactive with other species in that slug of fluid.

In embodiments wherein rock matrices may be low in calcium-bearing minerals (e.g. calcite, gypsum, anhydrite, apatite, or calcium bentonite), it may be advantageous to generate fractures initially with a solution of calcium chloride (e.g., 1% to 20% $CaCl_2$). After leak-off, or removing such fluid after a soaking period, a subsequent reactant slug of fluid containing sodium silicate (e.g., 1% to 20% $NaSiO_4$) may be injected. The first slug may dehydrate and stabilize any shale in the rock matrix. The calcium present in the first reactant slug may bind to clay surfaces and may crosslink with proximal clay particles. The residual calcium may remain in solution in pore spaces and/or micro-fractures after leak off and/or production of excess fluid in the individual fracture. In a subsequent injection, the silicate anions may be provided which may invade the pore and/or fracture space. The silicate may react with the calcium to form calcium silicate and silica gels that further crosslink clay and mineral surfaces while clogging any pores and/or micro-fracture volumes with the gel. In a separate embodiment, the reactants may be injected to fill a single fracture as long as the reactant slugs are separated by spacers comprising fresh water or a similarly unreactive fluid. After treating the rock matrix surrounding the fracture, non-reactive fresh and/or salty water may be injected and produced repetitively without material damage to or erosion of the rock matrix. The treatment may be repeated to strengthen and/or reinforce the rock matrix as needed.

In embodiments wherein rock matrices contain significant volumes of calcium-based minerals, the order of slugs of reactants may be reversed. If the order of slugs of reactants is reversed, the silicate may immediately react with calcium mineral surfaces and dissolved calcium ions to faun gels and crosslink clay and mineral surfaces. Other aspects of the treatment may remain the same, including slug sequencing, fresh water spacers, and additional additives.

It is further recognized that the means for sealing and toughening the fracture are focused on the outer or tip region of the fracture and that it may be convenient to treat the fracture in multiple stages, for example with a toughening treatment fluid (the main SEAL stage) with another material that can serve as a cycling fluid (a SWEEP stage). Further, it may be convenient to precede the toughening treatment with a fluid to open the fracture (a PAD stage) to suppress premature interaction of particles with the surfaces of the fractured rock. Thus, a complete treatment may be comprised of several stages comprising PAD, SEAL and SWEEP, of which the PAD and SWEEP are optional. To prevent mixing and optimize orderly displacement, that increasing the viscosity and/or yield stress (also known as gel strength) with each stage may be preferred. Fundamentally, stable displacement with minimal mixing may be optimized when the pressure gradient increases materially at the interface between each successive stage.

Although the present invention has been described with respect to specific details, it is not intended that such details should be regarded as limitations on the scope of the invention, except to the extent that they are included in the accompanying claims.

What is claimed:

1. A method for storing and producing energy, comprising:
    injecting resins, particulates, or chemicals suspended in a fluid down a well to a fracture in a rock matrix, thereby causing an apparent fracture toughness of the fracture to become artificially increased;
    pumping a working fluid down the well to the fracture to flow to a tip of the fracture;
    storing the working fluid in the fracture as mechanical energy; and
    before leakoff of the working fluid from the fracture, reducing pressure in the well so as to produce a portion of the working fluid up the well and allowing pressure of the produced working fluid to produce power.

2. The method of claim 1, wherein the resins, particulates, or chemicals comprise lost circulation materials.

3. The method of claim 1, wherein the resins, particulates, or chemicals comprise water shut-off treatments.

4. The method of claim 1, wherein the causing the apparent fracture toughness of the fracture to become artificially increased results in the step of storing the working fluid in the fracture to be performed at a higher net pressure within the fracture.

5. The method of claim 1, wherein the causing the apparent fracture toughness of the fracture to become artificially increased results in the step of storing the working fluid in the fracture to be performed at a higher capacity within the fracture.

6. The method of claim 1, wherein the causing the apparent fracture toughness of the fracture to become artificially increased results in the step of pumping the working fluid down the well, or the step of reducing pressure in the well so as to produce a portion of the working fluid up the well, or combinations thereof, to be performed at a higher rate of flow of the working fluid into and out of the fracture.

7. A method of cycling a working fluid into and out of a fracture to perform useful work, comprising:
    injecting resins, particulates, or chemicals suspended in a fluid down a well to a fracture in a rock matrix, thereby causing an apparent fracture toughness of the fracture to become artificially increased;
    pumping a working fluid down the well to the fracture to flow to a tip of the fracture;
    storing the working fluid in the fracture as mechanical energy; and
    before leakoff of the working fluid from the fracture, reducing pressure in the well so as to produce a portion of the working fluid up the well and allowing pressure of the produced working fluid to perform useful work.

8. The method of claim 7, wherein the useful work comprises rejecting a heat from the working fluid into the fracture as a result of the pumping and storing.

9. The method of claim 8, wherein the rejecting comprises supporting a geothermal ground loop HVAC system.

10. The method of claim 7, wherein the useful work comprises accepting a heat into the working fluid from the fracture as a result of the pumping and storing.

11. The method of claim 10, wherein the accepting comprises supporting a geothermal ground loop HVAC system.

12. The method of claim 7, wherein the useful work comprises energizing a desalination process.

13. The method of claim 7, wherein the useful work comprises energizing an electricity production process.

14. The method of claim 7, wherein the useful work comprises extracting a heat from the fracture into the working fluid to energize process heating.

15. The method of claim 7, wherein the useful work comprises extracting a heat from the fracture into the working fluid to energize district heating.

* * * * *